United States Patent [19]
Clement et al.

[11] Patent Number: 5,890,274
[45] Date of Patent: Apr. 6, 1999

[54] METHOD OF PRODUCING A COATING LAYER ON A LOCALIZED AREA OF A SUPERALLOY COMPONENT

[75] Inventors: Jean-François Clement, Yerres; Jean-Pierre Ferte, Corbeil-Essonnes, both of France

[73] Assignee: Societe Nationale d'Etude et de Construction de Moteurs d'Aviation "Snecma", Paris, France

[21] Appl. No.: 816,738

[22] Filed: Mar. 14, 1997

[30] Foreign Application Priority Data

Mar. 14, 1996 [FR] France .................................. 96.03202

[51] Int. Cl.[6] ...................................................... B23P 25/00
[52] U.S. Cl. .................. 29/527.2; 29/889.7; 228/248.1; 427/456
[58] Field of Search ..................................... 427/456, 405, 427/383.7; 156/242, 244.25; 29/889.7, 527.2; 228/248.1

[56] References Cited

U.S. PATENT DOCUMENTS

| | | | |
|---|---|---|---|
| 4,101,715 | 7/1978 | Rairden | 427/456 |
| 4,198,442 | 4/1980 | Gupta et al. | 427/456 |
| 4,726,101 | 2/1988 | Draghi et al. | 29/156.8 B |
| 4,861,618 | 8/1989 | Vine et al. | 427/456 |

FOREIGN PATENT DOCUMENTS

| | | |
|---|---|---|
| 0 279 058 | 8/1988 | European Pat. Off. . |
| 2 397 259 | 2/1979 | France . |
| 2 511 908 | 3/1983 | France . |
| 2 691 658 | 7/1994 | France . |
| 44 11 680 | 8/1995 | Germany . |

OTHER PUBLICATIONS

E. Lugscheider, et al., "Mettalurgical Aspects of Additive–Aided Wide–Clearance Brazing with Nickel Based Filler Metals", Welding Journal, Vol. 68, No. 1, Jan. 1989, pp. 9s–13s.

B. Wielage, et al., "Hochtemperaturloten von x 5 CrNi 18 10 und NiCr20TiAl bei durch thermisches Spritzen aufgebrachten Loten[1] ", Vol. 42, No. 5, May 1990, pp. 228–231.

*Primary Examiner*—Janyce Bell
*Attorney, Agent, or Firm*—Oblon, Spivak, McClelland, Maier & Neustadt, P.C.

[57] ABSTRACT

A method of producing a coating layer on a localized area of a superalloy component comprises the steps of:

a) producing a coating layer element with specific functional properties;

b) depositing on at least one surface of the coating layer element a uniform layer obtained from a powder mixture consisting of a powder of a nickel or cobalt superalloy and a powder of a brazing filler metal;

c) brazing the coated composite coating layer element obtained from step (b) on to the localized area of the component; and, d) machine finishing the component.

20 Claims, 5 Drawing Sheets

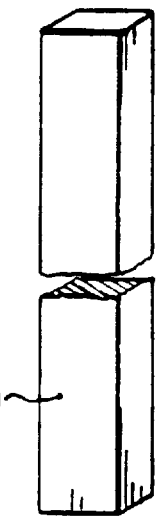
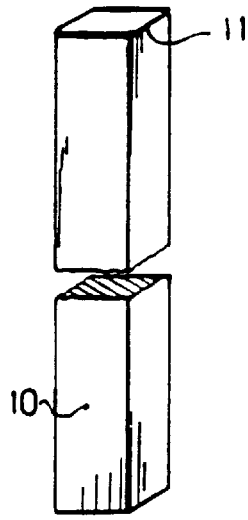
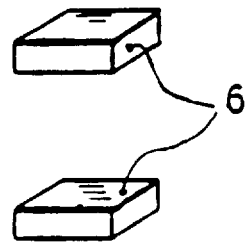
FIG.5    FIG.6    FIG.7
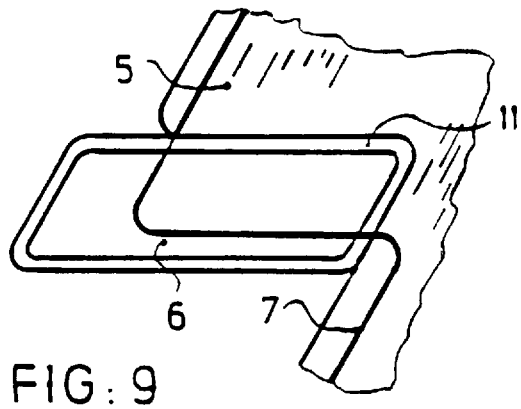
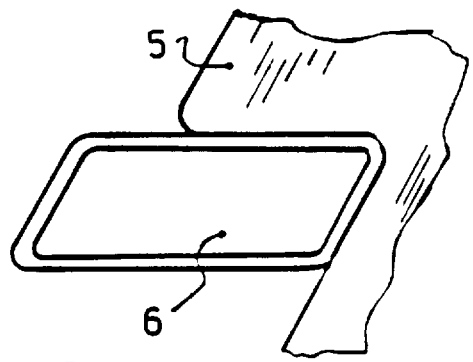
FIG.9    FIG.8

METHOD OF PRODUCING A COATING LAYER ON A LOCALIZED AREA OF A SUPERALLOY COMPONENT

BACKGROUND OF THE INVENTION

1. Field of the Invention

The present invention relates to a method of producing a coating layer on a localized area of a component made of a superalloy, particularly a component intended for use in an aeronautical application such as an aircraft engine.

2. Summary of the Prior Art

It is known in numerous applications to require particular functional properties in localized areas of components, such as improved wear resistance or improved oxidation stability, depending on a variety of particular stresses or contacts. For this purpose, various processes have been proposed to achieve the joining of a coating layer element to a component. For example, FR-A-2317259 envisages melt deposition, using welding means, of a layer of a crack-resistant alloy on the tip of a blade, followed by a layer of hard and/or oxidation/corrosion-resistant alloy. However, melt coating processes are limited by the very low weldability of nickel or cobalt based superalloys, particularly in the cast state.

FR-A-2511908 describes a diffusion brazing joining method which enables an elementary part in the form of a pre-sintered blank obtained from a mixture of two powders to be added to a nickel or cobalt based superalloy component. However, depending on the particular surface properties sought in certain applications, it is not possible in certain cases to obtain a satisfactory self-brazable material from a homogeneous mixture of powders.

In FR-A-2691658, a coating layer element is obtained from the production of three successive layers by plasma flame spraying. However, this solution is applicable only when the joining surface is flat, and also requires that pressure should be applied to ensure metallurgical bonding. Furthermore, the thickness of the deposition is limited to 1 mm.

SUMMARY OF THE INVENTION

In order to meet satisfactorily a variety of applications without suffering the above mentioned drawbacks of the known prior art, according to the invention there is provided a method of producing a coated element on a localized area of a component made of a superalloy, comprising the steps of: a) making an element made of a particular metallic material hating specific functional properties suited to the said area of said component; b) depositing on at least one surface of the said element a uniform layer obtained from a powder mixture consisting of a powder of a nickel or cobalt superalloy and a powder of a brazing filler metal; c) brazing the coated element obtained from step (b) on to said localized area of said component; and, d) machine finishing said component.

The making of the element in step (a) of the method may be achieved by machining, lost wax casting or powder metallurgy techniques.

The deposition in step (b) of the method may be achieved either by plasma spraying of the powder mixture under partial pressure, or by cold press sintering of the powder mixture followed by a densification treatment, or by placing in position a strip made from the powder mixture followed by a densification treatment.

Preferably, step (c) includes the preliminary steps of positioning said coated element on said localized area of said component and tacking said coated element in position by capacitor discharge. The brazing to achieve a metallurgical joint between the coated element and the component may then be carried out either by a thermal treatment under vacuum in a furnace or by controlled energy beam heating in a controlled atmosphere.

Other features and advantages of the invention will become apparent from the following description of the preferred embodiments, given by way of example, with reference to the attached drawings.

BRIEF DESCRIPTION OF THE DRAWINGS

FIG. 5 shows diagrammatically a first stage in the production of the coated plates for use in the FIG. 4 embodiment;

FIG. 6 shows diagrammatically a second stage in the production of the coated plates for use in the FIG. 4 embodiment;

FIG. 7 shows diagrammatically a third stage in the production of the coated plates for use in the FIG. 4 embodiment;

FIG. 8 shows diagrammatically the joining of one of the coating plates to a shoulder of the blade platform;

FIG. 9 is a view similar to FIG. 8 but showing the outline of the machine finished platform;

DESCRIPTION OF THE PREFERRED EMBODIMENTS

With the aim of producing a coated element on a localized area of a component made of a nickel or cobalt superalloy, the method of the invention includes the following steps.

Figure 1:
FIG. 1 shows an example of an element such as may be produced in step (a) of the method of the invention.
Figure 2:
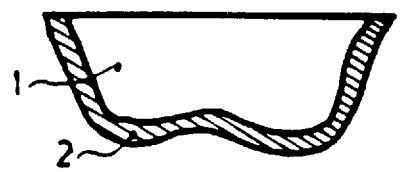
FIG. 2 shows the element of FIG. 1 after the deposition of a surface layer thereon in step (b) of the method.

In a first step (a), an element 1, such as diagrammatically shown in FIG. 1, is produced from a particular metallic material possessing the specific functional properties to be provided by the coated layer. The geometry of the element 1 depends on the area of the component which is to be coated. The element 1 may be formed by any suitable known manufacturing process, such as machining, lost wax casting or a powder metallurgy technique.

In a second step (b), a uniform layer 2 of a mixture of powders is deposited on the surface of the element 1 which is to be joined to the component as shown in FIG. 1. The thickness of the deposit may vary between 0.1 and 1 mm, depending on the application. The composition of the powder mixture may be as described in FR-A-2511908 and includes a powder of pre-alloyed nickel or cobalt, and a powder of a brazing filler metal in specific proportions depending on the application. Deposition may be effected by one of the following known methods, depending on the application:

- plasma projection of the powder mixture under partial pressure;
- cold sintering of the powder mixture on the surface of the element 1 in a press, followed by heat treatment under vacuum in a furnace to achieve densification of the mixture;
- placement of a strip made from the mixture of powders and thermal treatment for densification and sintering.

Figure 3:
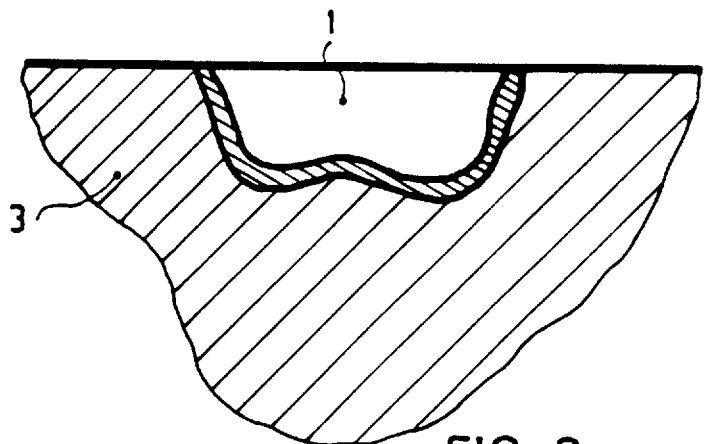
FIG. 3 shows the coated element of FIG. 2 metallurgically joined to a superalloy component by the method of the invention.

In a third step (c) the coated element 1 obtained after step (b) is positioned on the component 3, as shown in FIG. 3, and a metallurgical joint between the element and the component is obtained by brazing. A partial fusion of the mixture of powders is obtained by heating, such as by using a thermal treatment under vacuum in a furnace, or by using a controlled energy beam in a controlled atmosphere, for example an electron beam under vacuum or a laser beam in protective neutral gas.

It will be noted that when placing the coated element 1 in position, the layer 2 will accommodate the geometrical tolerances of the component 3, and a simple chemical surface cleaning is sufficient without any preliminary mechanical machining.

In the final step (d) a finish machining of the component is carried out in order to obtain continuity of the respective surfaces of the component 3 and of the coated element 1.

Two specific examples of the application of the method of the invention will now be described.

EXAMPLE 1

Figure 4:
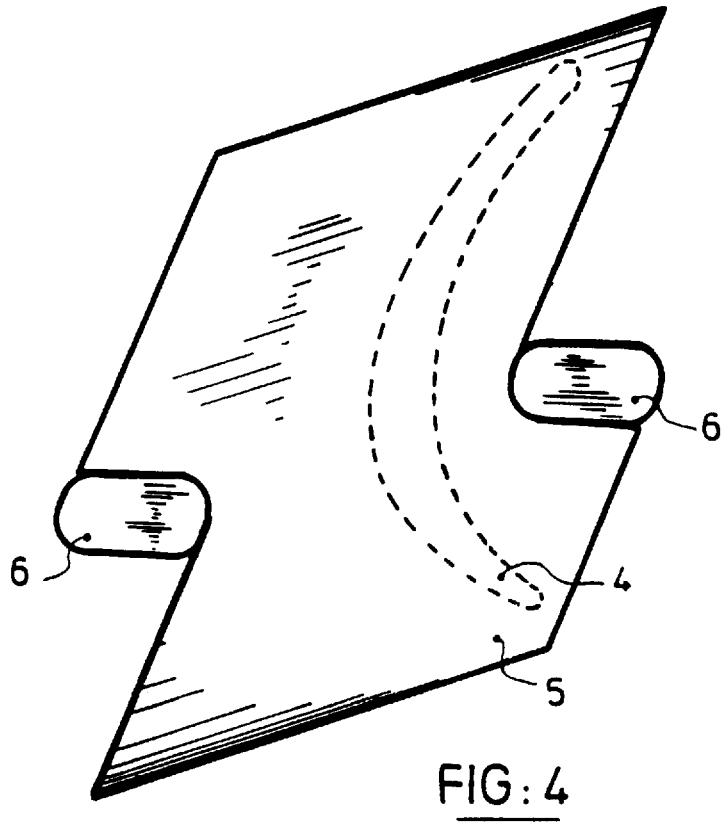
FIG. 4 shows diagrammatically a first embodiment of the application of the method of the invention to the addition of small coated plates to the shoulders of a turbine blade platform.

The component to which the invention is applied is a turbine blade 4 as diagrammatically shown in FIG. 4. The blade 4 has a platform 5, and anti-wear plates 6 forming coated element are to be added to the shoulders of the platform to improve its behaviour during operation in the event of clearances originating in particular from operating vibrations. The blade 4 is made of a nickel-based alloy having a nominal composition, in percentages by weight, of: W 12; Co 10; Cr 9; Al 5; Ti 2; Hf 2; Nb 1; and Ni as the remainder. The plates 6 are made of a cobalt-based alloy possessing the required properties, suitable alloys having the following nominal compositions in percentages by weight:

- either Cr 28; W 19.5; Ni 5; and the remainder Co;
- or Mo 28; Cr 17.5; Si 3.4; and the remainder Co;
- or Cr 24; Ni 10; W 7; Ta 3.5; Co 6; Zr 0.4; Ti 0.2; and the remainder Co.

In step (a) of the method, rods 10 as shown in FIG. 5 are obtained by machining rods of great length, so that the rod cross-section corresponds to the section of the plate 6 to be obtained. Alternatively, the rods 10 may be formed with the finished cross-sectional dimensions by lost wax coated.

In step (b) of the method, plasma spraying under partial pressure is used to deposit a powder mixture layer 11 of uniform thickness which in this embodiment is between 0.2 and 0.3 mm, the powder mixture possessing the following characteristics:

- a grain size of less than 106 $\mu$m; and,
- depending on the alloy used for the plates 6, a nominal composition of, in percentages by weight:
  - either 80% of a cobalt based powder A containing Cr 25; Ni 10; and W 7.5, and 20% of a brazing powder B termed Ni Cr B 1055 and comprising Cr 15; B 3.6; and nickel as the remainder;
  - or 70% of a nickel based powder A containing Co 17; Cr 15; Mo 5; Al 4; Ti 3.5, and 30% of a brazing powder B termed Ni Cr Si 1135 and comprising Cr 19; Si 10; and nickel as the remainder.

Figure 10:
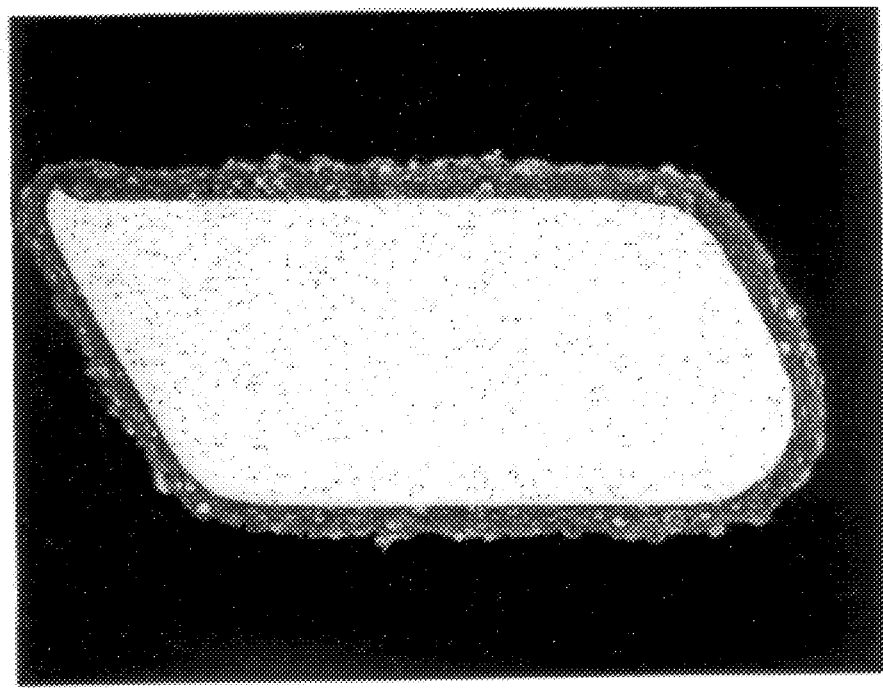
FIG. 10 is a microphotograph of a cross-section through a coated plate.
Figure 11:
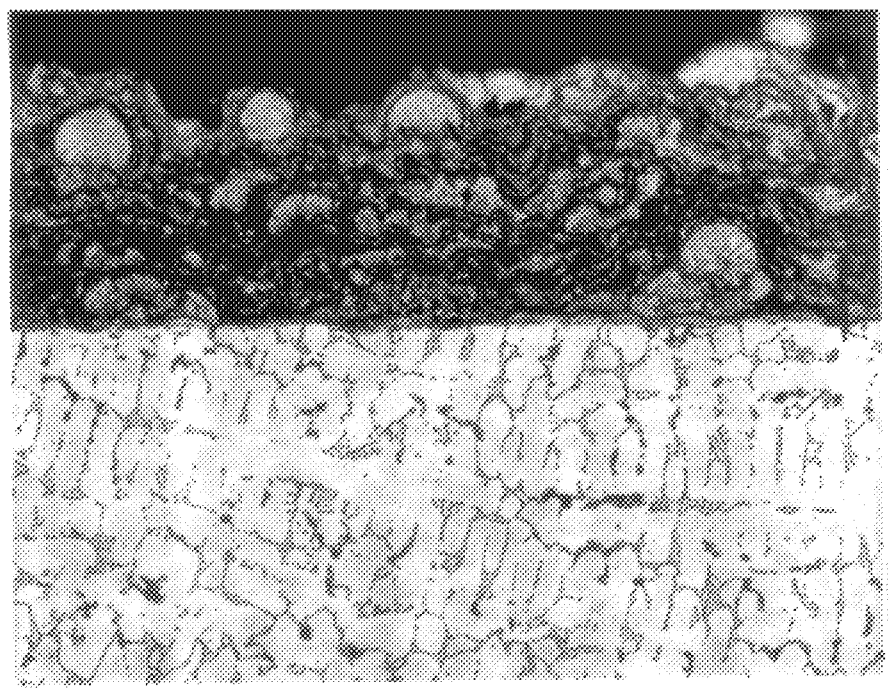
FIG. 11 shows a detail of the microphotograph of FIG. 10 to a larger scale.

The result is diagrammatically represented in FIG. 6, and also in FIGS. 10 and 11 which show microphotographs of a section of the rod 10 with its coated 11. A coated rod 10 is then cut by any known means, such as machining by electro-erosion with wire or cutting by a laser beam, so as to obtain the unitary plates 6 as shown in FIG. 7. The angle of the cutting plane is determined depending on the conicity of the gas flow path in the turbine, so that the face of the plate 6 situated on the flow path side after assembly on the blade follows the flow path profile by merging with the face of the platform situated on the flow path side. In contrast, the thickness of the plate 6 is determined so as to present, after assembly, an outside projection beyond the flow path.

Figure 12:
FIG. 12 is a microphotograph of a cross-section through a coated shoulder of the blade platform shown in FIG. 4.

In step (c) of the method, the plates 6 are first placed in position on the shoulders of the blade platform 5 as shown in FIG. 8, before being tacked in position by capacitor discharge. The details of this operation, as well as the equipment used, may be as described in EP-A-0454573. For a blade obtained by lost wax casting, a simple chemical cleaning of the assembly surface will suffice before placing the plates 6 in position, as the coated 11 on the plates 6 enables geometrical tolerances of the shoulders of platform 5 to be accommodated. Subsequently, a brazing operation under vacuum in a furnace is carried out in conditions determined by the materials used. In the present example, the temperature is between 1210° and 1240° C., and the duration is between 10 and 30 minutes. FIG. 12 shows a microphotograph of a cross-section through the joint between a plate 6 and a shoulder of the blade platform 5 obtained after brazing. A partial fusion of the coating 11 during the heat treatment provides a metallurgical bond between the plate 6 and the blade 5.

In step (d), adjustment to the dimensions of the finished component is achieved by machine finishing the component as diagrammatically represented in FIG. 9, the final outline being indicated at 7.

EXAMPLE 2

Figure 13:
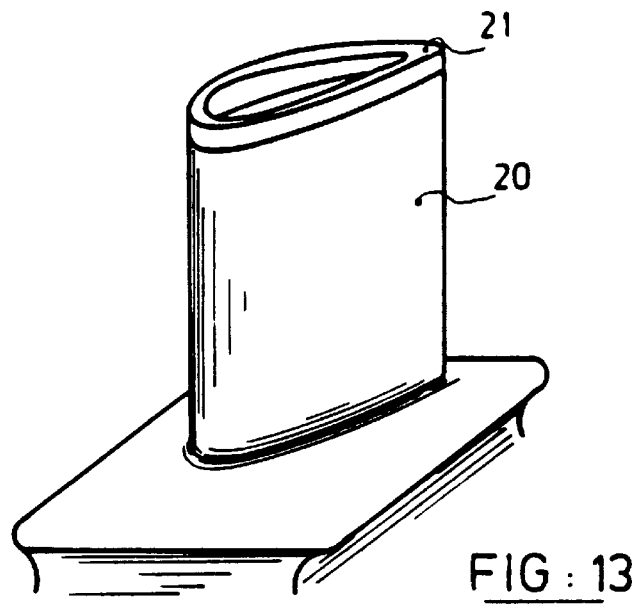
FIG. 13 shows diagrammatically a second embodiment of the application of the method of the invention to the addition of a small coated element, or plate, to the free tip of a movable turbine blade.

The component in this example is a turbine movable blade 20 as diagrammatically shown in FIG. 13, and the free tip of the blade 20 has a coated plate 21 added to it by the method of the invention. The blade 20 is made of a nickel-based superalloy obtained by monocrystalline casting and having a nominal composition, in percentages by weight: Ta 8; Cr 7.5; Co 6.5; W 5.5; Al 5.3; Mo 2; Ti 1.2; and the remainder Ni. The coated element constituted by the plate 21 is intended to provide oxidation resistant properties and has the nominal composition, in percentages by weight: Co 23; Cr 19; Al 8.5; Ta 4; Y 0.6; and Ni as the remainder.

Figure 14:
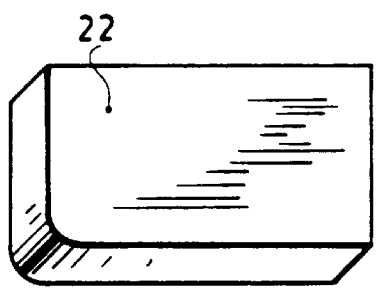
FIG. 14 shows diagrammatically a first stage in the production of the coated plate for use in the FIG. 13 embodiment.

In step (a) of the method, a plate 22 (FIG. 14) is made from the coated element material by lost wax casting, the plate being made overthick with respect to the final dimension envisaged for the component. In the next step (b) of the method a coating 23 is deposited by plasma spraying under partial vacuum on both faces of the plate 22, the coating 23 being of uniform thickness, which in this example is between 0.1 and 0.2 mm, and comprising a mixture of powders having the following characteristics:

a grain size of less than 106 µm, and a nominal composition, in percentages by weight, of: 80% of a nickel-based powder A containing either Cr 22; Al 8; Ta 5; and Y 0.6, or Co 17; Cr 15; Mo 5; Al 4; and Ti 3.5; with the remainder Ni; and 20% of a brazing powder B termed NiCoSiB 1060 and comprising Co 20; Si 4.5; B 3; and Ni as the remainder.

Figure 15:
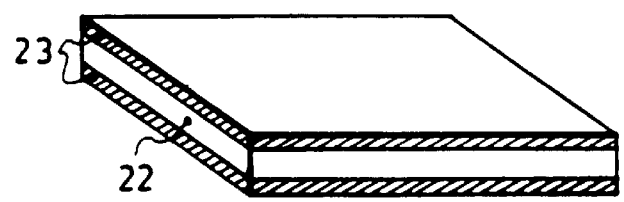
FIG. 15 shows diagrammatically a second stage in the production of the coated plate for use in the FIG. 13 embodiment.

The result is shown diagrammatically in FIG. 15, which shows the layers 23 deposited on the plate 22.

Figure 16:
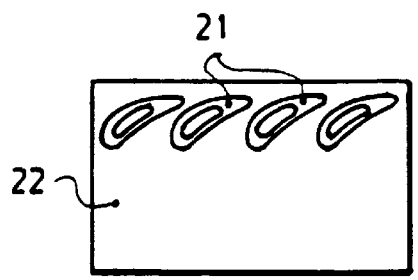
FIG. 16 shows diagrammatically a third stage in the production of the coated plate for use in the FIG. 13 embodiment.
Figure 17:
FIG. 17 shows diagrammatically a fourth stage in the production of the coated plate for use in the FIG. 13 embodiment; and, FIG. 18 shows a side view of the coated plate joined to tip of the blade.

As an alternative, the mixture of powders may be set in place on a face of the plate 22 in the form of an agglomerated strip, then subjected to a densification heat treatment carried out at a temperature of between 1150° and 1170° C. for 15 minutes. The coated plates 22 are then cut in any suitable known manner, such as by wire electro-erosion machining or by laser cutting, to form unitary plates 21 corresponding in outline to the tip of the blade 20 as diagrammatically shown in FIGS. 16 and 17.

Figure 18:
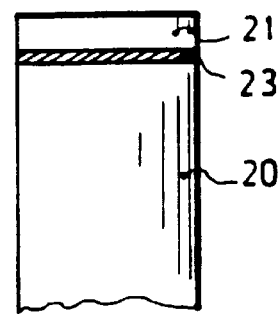

In step (c) a plate 21 is placed in position on the tip of the blade 5, as shown in FIG. 18, and tacked in position by capacitor discharge. Then, a brazing operation under vacuum is carried out in a furnace, in the present example, at a temperature of 1200° C. for 15 to 30 minutes, in order to obtain a fusion of the powder mixture and to ensure a metallurgical joint between the plate 21 and the blade 20.

Alternatively, the fusion of the powder mixture of the coating 23 of the plate 21 is achieved by controlled energy beam heating of the outer face of the plate 21, such as by an electron beam or a laser beam, in a controlled atmosphere.

In step (d), a finish machining of the blade 20 is carried out, particularly in the region of the tip to ensure the correct height of the blade.

We claim:

1. A method of producing a coated element on a localized area of a component made of a superalloy, comprising the steps of:
    a) making an element comprising a metallic material;
    b) depositing on at least one surface of the element a uniform layer obtained from a powder mixture consisting essentially of a powder of a nickel or cobalt superalloy, and a powder of a brazing filler metal, to form a coated element;
    c) brazing the coated element obtained from step (b) on to said localized area of said component; and
    d) machine finishing said component.

2. A method according to claim 1, wherein said element is obtained in step (a) from a rod which is machined to have a cross-section corresponding to the shape of the required coated element.

3. A method according to claim 1, wherein said element is obtained in step (a) from a rod which has a cross-section corresponding to the shape of the required coated element and which is produced by lost wax casting.

4. A method according to claim 1, wherein said element is obtained in step (a) from a rod which has a cross-section corresponding to the shape of the required coated element and which is produced by a powder metallurgy technique.

5. A method according to claim 1, wherein said element is obtained in step (a) from a plate produced by lost wax casting.

6. A method according to claim 1, wherein said uniform layer is deposited in step (b) by plasma spraying said powder mixture under partial pressure.

7. A method according to claim 1, wherein said uniform layer is deposited in step (b) by cold sintering said powder mixture around said element in a press, followed by a thermal densification treatment under vacuum in a furnace.

8. A method according to claim 1, wherein said uniform layer is deposited in step (b) by placing in position a strip made from said powder mixture followed by a thermal densification and sintering treatment.

9. A method according to claim 1, further comprising cutting said coated element to the geometric dimensions of said localized area of said component after step (b) by a machining process.

10. A method according to claim 1, wherein step (c) includes the preliminary steps of positioning said coated element on said localized area of said component and tacking said coated element in position by capacitor discharge.

11. A method according to claim 10, wherein said brazing is carried out by a thermal treatment under vacuum in a furnace after said tacking operation, said brazing achieving a metallurgical joint between said coated element and said component.

12. A method according to claim 10, wherein said brazing is carried out by controlled energy beam heating in a controlled atmosphere after said tacking operation, said brazing achieving a metallurgical joint between said coated element and said component.

13. A method according to claim 1, wherein said component is made by a lost wax casting process, and said coated composite coated element is brazed on to said localized area of said component in the rough cast state in step (c) after a preliminary chemical cleaning of the surface thereof.

14. A method of attaching a coated element onto a superalloy, comprising:
    brazing a coated element onto a superalloy;
    wherein said coated element comprises:
        (i) an element comprising a metallic material, and
        (ii) a uniform layer, on a surface of said element, prepared from a mixture consisting essentially of a nickel or cobalt superalloy, and a brazing filler metal.

15. The method of claim 14, further comprising, prior to said brazing, forming said uniform layer on a surface of said element by plasma spraying said mixture.

16. The method of claim 15, further comprising, after said brazing, machine finishing said coated element and said superalloy.

17. The method of claim 15, wherein said brazing is carried out by a thermal treatment under vacuum.

18. The method of claim 14, further comprising, after said brazing, machine finishing said coated element and said superalloy.

19. The method of claim 14, wherein said uniform layer is prepared by cold sintering said mixture around said element in a press, followed by thermal densification treatment under vacuum.

20. The method of claim 14, wherein said brazing is carried out by a thermal treatment under vacuum.

* * * * *